US006862928B2

United States Patent
Yamazaki et al.

(10) Patent No.: US 6,862,928 B2
(45) Date of Patent: Mar. 8, 2005

(54) METHOD FOR MEASURING INTAKE AIR VOLUME IN INTERNAL COMBUSTION ENGINE

(75) Inventors: Shigeru Yamazaki, Odawara (JP); Takahiko Ueta, Odawara (JP)

(73) Assignee: Mikuni Corporation, Tokyo (JP)

( * ) Notice: Subject to any disclaimer, the term of this patent is extended or adjusted under 35 U.S.C. 154(b) by 2 days.

(21) Appl. No.: 10/432,229

(22) PCT Filed: Nov. 8, 2001

(86) PCT No.: PCT/JP01/09795

§ 371 (c)(1), (2), (4) Date: Sep. 29, 2003

(87) PCT Pub. No.: WO02/42627

PCT Pub. Date: May 30, 2002

(65) Prior Publication Data

US 2004/0074290 A1 Apr. 22, 2004

(30) Foreign Application Priority Data

Nov. 22, 2000 (JP) ........................................ 2000-355813

(51) Int. Cl.$^7$ .............................................. G01M 15/00
(52) U.S. Cl. ........................ 73/118.2; 73/115; 73/117.3
(58) Field of Search .......................... 73/112, 115, 116, 73/117.2, 117.3, 118.1, 118.2

(56) References Cited

U.S. PATENT DOCUMENTS

| | | | | |
|---|---|---|---|---|
| 6,584,960 B2 | * | 7/2003 | Kishibata et al. | 123/478 |
| 2001/0002587 A1 | * | 6/2001 | Walter et al. | 123/90.15 |
| 2002/0035986 A1 | * | 3/2002 | Takagi et al. | 123/481 |
| 2003/0037770 A1 | * | 2/2003 | Kishibata et al. | 123/478 |
| 2003/0154777 A1 | * | 8/2003 | Worth et al. | 73/118.2 |

* cited by examiner

*Primary Examiner*—Eric S. McCall
(74) *Attorney, Agent, or Firm*—Wenderoth, Lind & Ponack, L.L.P.

(57) ABSTRACT

Intake air pressure of an internal combustion engine is detected at a plurality of timings during a full stroke, a threshold pressure is set between the minimum and maximum values of detected intake air pressures, detected intake air pressures lower than the threshold pressure are averaged, and an intake air volume is measured using the average intake air pressure as a parameter.

A method for measuring the intake air volume in an internal combustion engine is thereby provided in which the relation between a detected intake air pressure and an intake air volume is linear regardless of crank timing when the intake air volume is estimated based on the intake air pressure.

20 Claims, 14 Drawing Sheets

METHOD FOR MEASURING INTAKE AIR VOLUME IN INTERNAL COMBUSTION ENGINE

TECHNICAL FIELD

The present invention relates to a method for measuring intake air volume based on which a fuel injection amount is calculated in an internal combustion engine, and more particularly, to a method for measuring intake air volume in an internal combustion engine in which the intake air volume is calculated using a pressure inside an air intake pipe as a parameter.

BACKGROUND ART

In general, in internal combustion engines, since a fuel injection amount is set based on intake air volume, it is required to always measure the intake air volume.

In particular, in an independent air intake type of internal combustion engine such as a multi-slot type and single cylinder type, since there is no air intake chamber upstream of an air intake pipe, it is difficult to measure the intake air volume.

Therefore, it has been performed that the intake air volume is estimated using the number of rotations of the internal combustion engine and a throttle open angle as parameters.

However, in such a method, there occurs an inconvenience that the actual intake air volume departs from the state of operation of the internal combustion engine that is determined based on the number of rotations and the throttle open angle.

In order to overcome such an inconvenience, a method has been proposed of detecting a pressure inside an air intake pipe using an intake air pressure sensor and based on the intake air pressure, estimating the intake air volume.

When applying such an estimation method to the independent air intake type of internal combustion engine, since there is no air intake chamber as described above, a large intake air pressure pulsation occurs, which causes such an inconvenience such that the intake air volume cannot be measured accurately.

That is, such a large pulsation occurs, in particular, when a large negative pressure is generated in the intake at the time of medium load and then the pressure returns to the atmospheric pressure.

In order to estimate the intake air volume, it is required to unify varying intake air pressures, and therefore, the varying intake air pressures are averaged.

However, when averaging the large intake air pressure pulsation as described above, since pressures near the atmospheric pressure are also included to average, it is not possible to estimate an accurate intake air volume, and such averaging is not effective in estimating the intake air volume.

Further, in order to overcome such an inconvenience, a method has been performed of extracting intake air pressures at specific timing or in a specific range with respect to a crank angle signal, and averaging the specific intake air pressures.

For example, as disclosed in JP H11-62691, intake air pressures near the bottom dead center of the piston are averaged.

However, in the method for estimating the intake air volume using the value obtained by averaging intake air pressures in such a specific range, it is required to set the timing of detecting the intake air pressure using the crank angle signal, resulting in a problem that the control is complicated.

Further, when an intake air pressure sensor is provided at a position some distance from an air intake pipe (for example, in an engine control unit), the air intake pipe and intake air pressure sensor are communicated using a connecting pipe.

Therefore, a timewise delay occurs between an actual variation in pressure inside the air intake pipe and a detected variation in pressure, or the detected variation in pressure is smoothed as compared to the actual variation in pressure i.e. so-called rounding occurs, depending on the capacity of the connecting pipe, thereby making it difficult to sample accurate intake air pressures at specific crank timings.

In view of the above-mentioned conventional problems, it is an object of the present invention to provide a method for measuring intake air volume in an internal combustion engine, which enables estimation of intake air volume with high precision, by setting the relationship between a detected intake air pressure and intake air volume to be more linear independently of crank timing, in estimating the intake air volume based on the intake air pressure.

DISCLOSURE OF INVENTION

In order to achieve the above-mentioned object, in a method for measuring intake air volume in an internal combustion engine as described in claim 1 of the present invention, intake air pressures in the internal combustion engine are detected at a plurality of timings during all the strokes of the internal combustion engine, a threshold pressure is set between a minimum value and maximum value of detected intake air pressures, intake air pressures less than or equal to the threshold pressure among the detected intake air pressures are averaged to obtain an average intake air pressure, and using the average intake air pressure as a parameter, the intake air volume is measured.

In the method for measuring intake air volume in an internal combustion engine as described in claim 2 of the present invention, a difference between the maximum value and minimum value of intake air pressures as described in claim 1 is obtained, and a predetermined rate of the difference between the maximum value and minimum value is added to the minimum value to set the threshold pressure.

In the method for measuring intake air volume in an internal combustion engine as described in claim 3 of the present invention, the maximum value as described in claim 1 or 2 is the atmospheric pressure.

In the method for measuring intake air volume in an internal combustion engine as described in claim 4 of the present invention, the maximum value as described in claim 1 or 2 is an average value of all the intake air pressures detected in all the strokes of the internal combustion engine.

In the method for measuring intake air volume in an internal combustion engine as described in claim 5 of the present invention, a virtual intake air pressure line is created by connecting linearly all the intake air pressures detected in all the strokes of the internal combustion engine as described in one of claims 1 to 4, and based on the virtual intake air pressure line, the average intake air pressure is calculated.

In the method for measuring intake air volume in an internal combustion engine as described in claim 6 of the present invention, the predetermined rate of the difference between the maximum value and minimum value which is added to the minimum value as described in one of claims 1 to 5 is varied corresponding to the state of operation of the internal combustion engine.

In the method for measuring intake air volume in an internal combustion engine as described in claim 7 of the present invention, the internal combustion engine as described in one of claims 1 to 6 is an independent air intake type of internal combustion engine.

BEST MODE FOR CARRYING OUT THE INVENTION

One embodiment of the present invention will be described below with reference to accompanying drawings.

Figure 1:
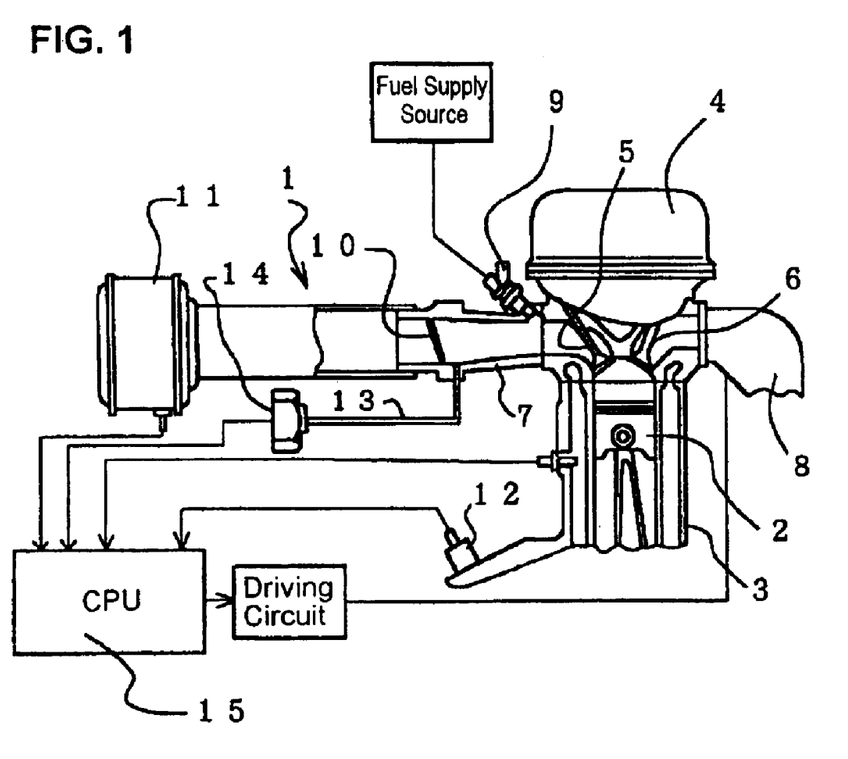
FIG. 1 is a view showing a schematic configuration of an independent air intake type of internal combustion engine to which one embodiment of the present invention is applied.

FIG. 1 is a view showing a schematic configuration of a principal portion of an internal combustion engine 1 to which this embodiment is applied. The internal combustion engine 1 is generally comprised of a cylinder block 3 to which a piston 2 is inserted slidably, a cylinder head 4 that is mounted on an upper portion of the cylinder block 3 and forms a combustion chamber, an intake valve 5 and an exhaust valve 6 that are attached to the cylinder head 4 to be opened and closed, an intake pipe 7 that is continuously provided to the cylinder head 4 and forms an intake passage, an exhaust pipe 8 that is opened and closed by the exhaust valve 6, a fuel injection nozzle 9 that injects the fuel inside the intake pipe 7, a throttle valve 10 that controls the intake air volume, an air cleaner 11 that is attached to an end portion on upstream side of the intake pipe 7, a crank angle sensor 12 for detecting a rotation position of a crank shaft (not shown) coupled to the piston 2, an intake air pressure sensor 14 that is communicated with the intake pipe 7 via an connecting pipe 13 and detects a pressure inside the intake pipe 7, and a CPU 15 that controls operation of the internal combustion engine 1.

Thus, the internal combustion engine 1 composes an independent air intake type of internal combustion engine where each cylinder has an air intake system.

The following is given of a method for measuring intake air volume in the internal combustion engine 1 according to this embodiment.

Figure 2:
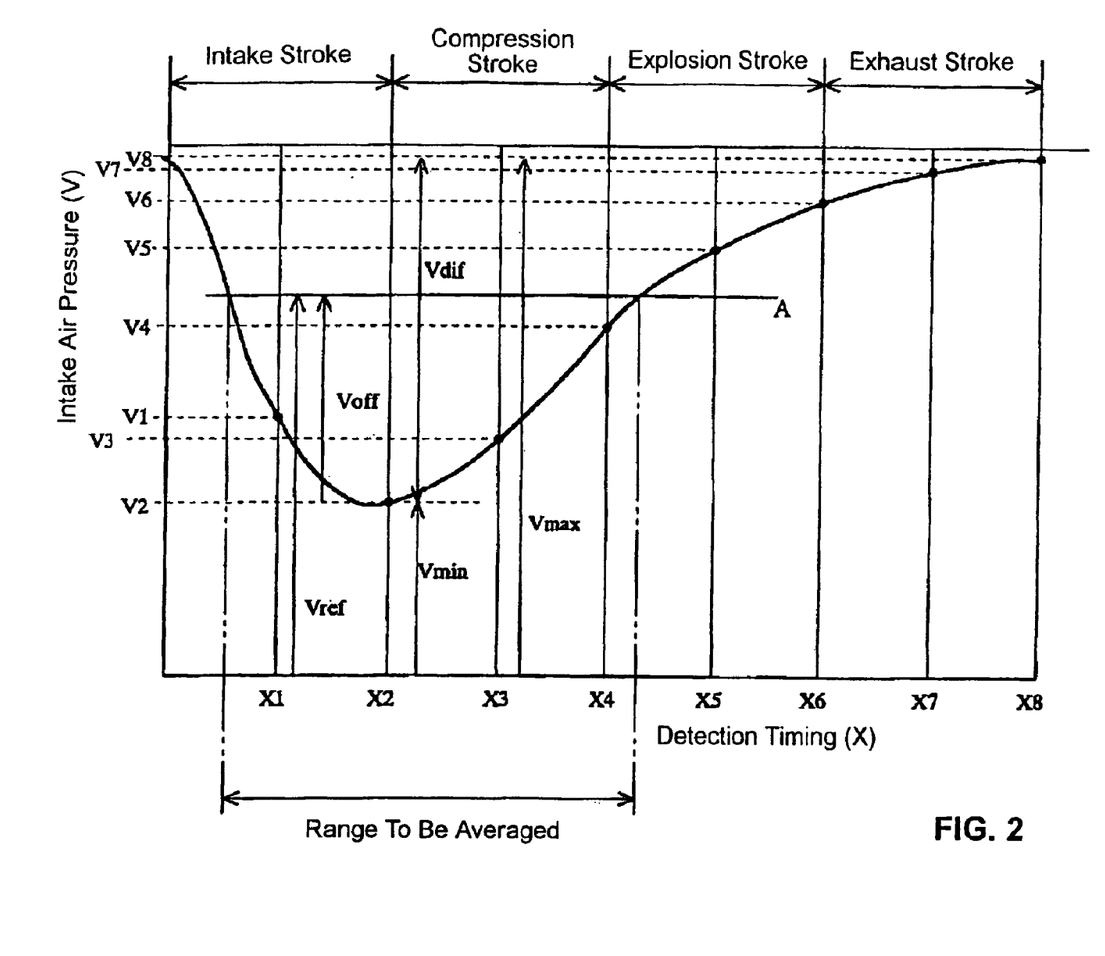
FIG. 2 is a graph showing an intake air pressure line in the internal combustion engine to illustrate the one embodiment of the present invention.

In this embodiment, an intake air pressure V in the internal combustion engine 1 is detected at each of a plurality of timings (in this embodiment, detected at eight points, X1 to X8, as shown in FIG. 2) during all the strokes of the internal combustion engine 1, based on these detected values V1 to V8 an average intake air pressure Vave is calculated according to following procedures, and the intake air volume is measured using the average intake air pressure Vave as a parameter.

1: Detect a minimum value Vmin of the intake air pressure.
2: Detect a maximum value Vmax of the intake air pressure.
3: Calculate Vmax−Vmin=Vdif.
4: Calculate VdifxR(%)=Voff.

In addition, R is a predetermined rate and a constant set as appropriate.

5: Calculate Vmin+Voff=Vref
6: Among the detected intake air pressures, intake air pressures not more than Vref (hereinafter, referred to as a threshold pressure) calculated in procedure 5 are averaged to calculate the average intake air pressure Vave.

To explain a specific example, FIG. 2 shows variations in intake air pressure during all the strokes of the internal combustion engine with low load, where eight detection timings of intake air pressure are provided and indicated by X1 to X8, while pressures detected at detection timings X1 to X8 are indicated by V1 to V8, respectively.

In this figure, Vmax is V8 (Vmax=V8), Vmin is V2 (Vmin=V2), and when the constant R is set at 50%, the following equations are obtained:

$$V\text{dif}=V\text{max}-V\text{min}=V8-V2 \qquad \text{Eq. (1)}$$

$$V\text{off}=V\text{dif}\times 50\%=(V8-V2)\times 50\% \qquad \text{Eq. (2)}$$

$$V\text{ref}=V\text{min}+V\text{off}=V2+(V8-V2)\times 50\% \qquad \text{Eq. (3)}$$

The threshold pressure Vref obtained from the above Equation 3 is indicated by straight line A in FIG. 2, and detected pressures less than the threshold pressure Vref are V1, V2, V3 and V4.

Then, the average intake air pressure Vave is calculated by averaging detected values V1, V2, V3 and V4. In other words:

$$V\text{ave}=(V1+V2+V3+V4)/4$$

Figure 3:
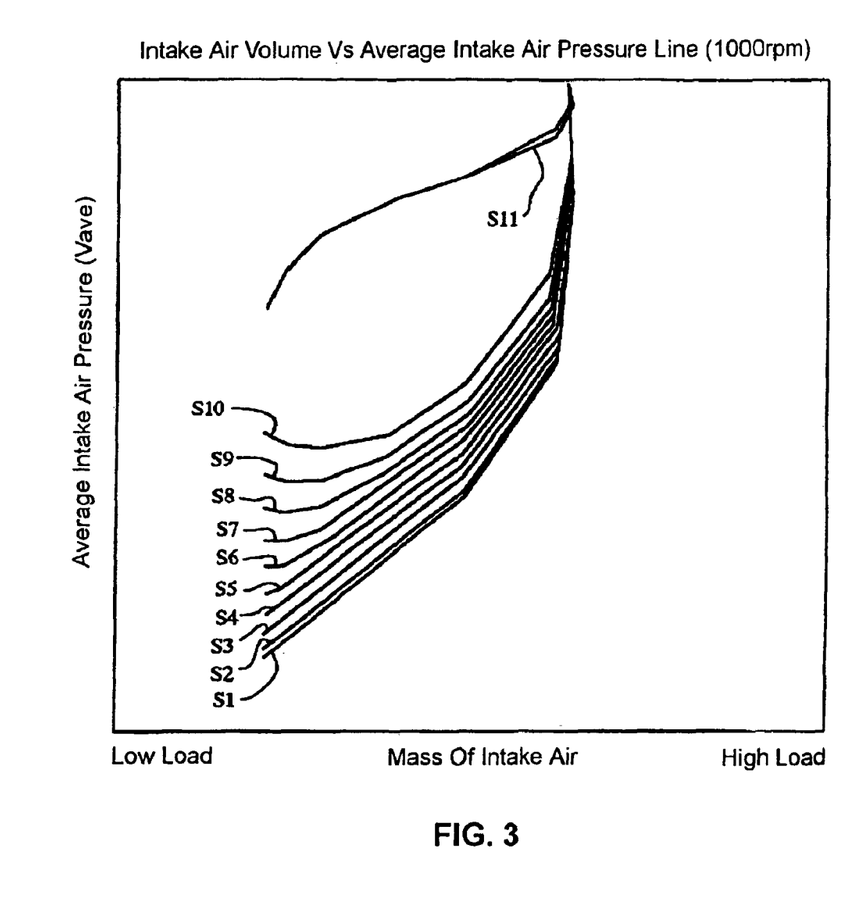
FIG. 3 is a graph showing the relationship between the intake air volume and average intake air pressure in the one embodiment of the present invention.
Figure 4:
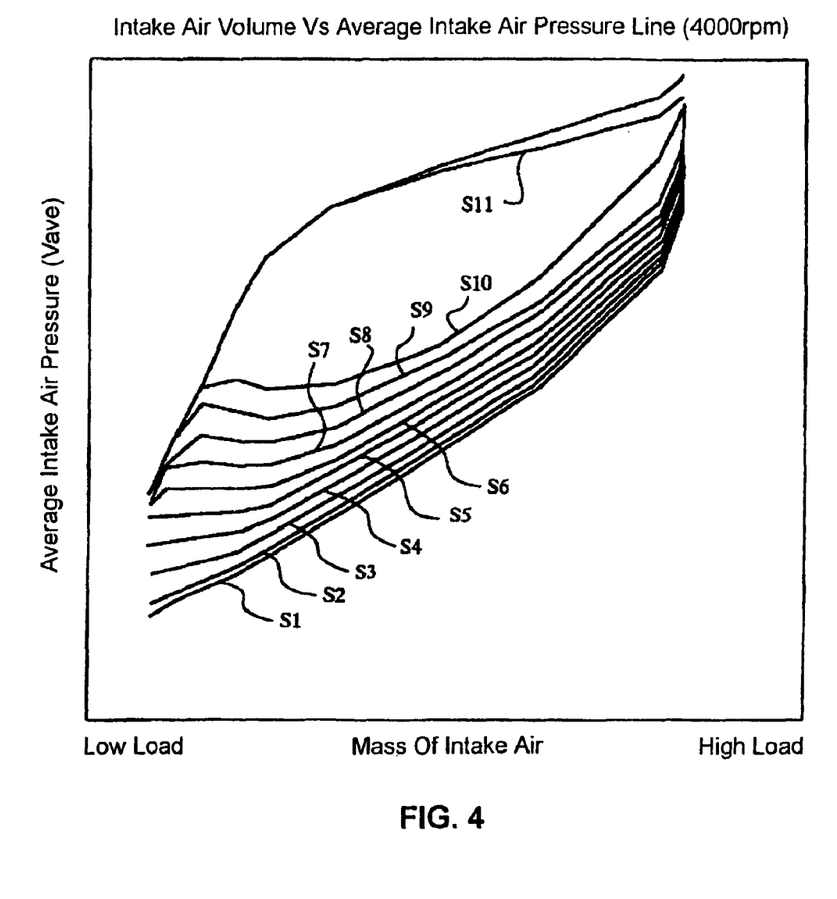
FIG. 4 is another graph showing the relationship between the intake air volume and average intake air pressure in the one embodiment of the present invention.
Figure 5:
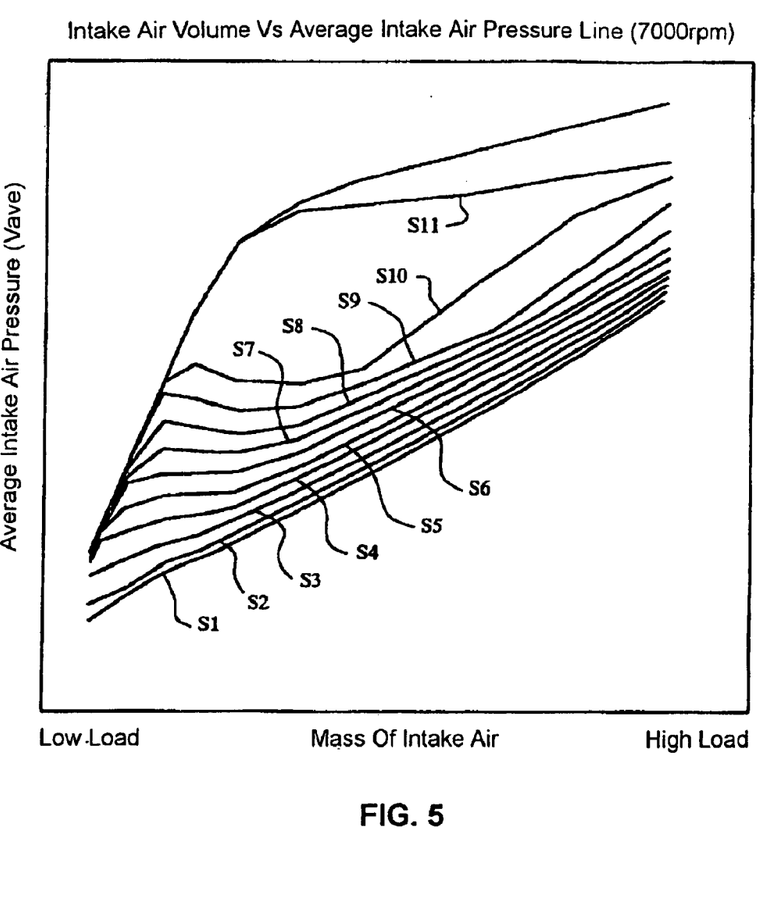
FIG. 5 is still another graph showing the relationship between the intake air volume and average intake air pressure in the one embodiment of the present invention.

The relationships each between thus obtained average intake air pressure Vave and suction intake amount (intake air volume) are shown in FIG. 3 to FIG. 5 by curves S1 to S11. In the figures, S1 to S11 are curves when R is varied, and the relationships are as follows:

R(S1)=5, R(S2)=10, R(S3)=20, R(S4)=30, R(S5)=40, R(S6)=50, R(S7)=60, R(S8)=70, R(S9)=80, R(S10)=90, and R(S11)=100.

Further, FIG. 3 shows results of a case that the number of rotations of the internal combustion engine 1 is 1000 (rpm), FIG. 4 shows results of a case that the number of rotations of the internal combustion engine 1 is 4000 (rpm), and FIG. 5 shows results of a case that the number of rotations of the internal combustion engine 1 is 7000 (rpm).

As is apparent from these results, when $5 \leq R < 50$, the relationship between the calculated average intake air pressure Vave and the intake air volume (mass of intake air) is approximately linear in almost all the load regions.

Accordingly, by selecting the constant R as appropriate, even when the calculated average intake air pressure Vave is used as a parameter of the intake air volume, it is possible to estimate the intake air volume with high precision, and as a result, it is possible to control a fuel injection amount properly.

Further, according to this embodiment, intake air pressures in all the strokes of the internal combustion engine 1 are detected at a plurality of timings, and based on the plurality of detected intake air pressures V1 to V8, the average intake air pressure Vave is calculated, whereby it is possible to calculate the average intake air pressure Vave independently of the crank angle of the internal combustion engine 1.

Accordingly, in the case where the intake air pressure sensor 14 is provided at a position spaced from the intake pipe 7 using the connecting pipe 13, when delays and/or rounding occurs in variations in the detected intake air pressure with respect to variations in the intake air pressure of the intake pipe 7, effects of the delays and rounding are suppressed, and the control to estimate the intake air volume is made easy, while being performed with high precision.

Further, reduced effects of the connecting pipe 13 that causes the delays and rounding enhance the versatility of setting position of the intake air pressure sensor 14 i.e. the versatility of layout of structural members of an internal combustion engine.

Furthermore, in the conventional method for estimating intake air volume using intake air pressures in all the strokes as parameters, since the relationship between the intake air pressure and the intake air volume becomes inaccurate at the time of high load, it is required to switch the control method at the time of high load to a method for estimating the intake air volume using the throttle open angle and the number of rotations of the internal combustion engine. In contrast thereto, such switching of control is not required in this embodiment.

Also from this respect, the control to estimate the intake air volume is made, and since a throttle open angle signal is not required to estimate the intake air volume, a control apparatus is simplified.

Then, the constant R is set based on a state of the load on internal combustion engine 1, and is selected so that the relationships between the average intake air pressure Vave and the intake air volume in load regions are in good agreement as possible with one another.

Figure 6:
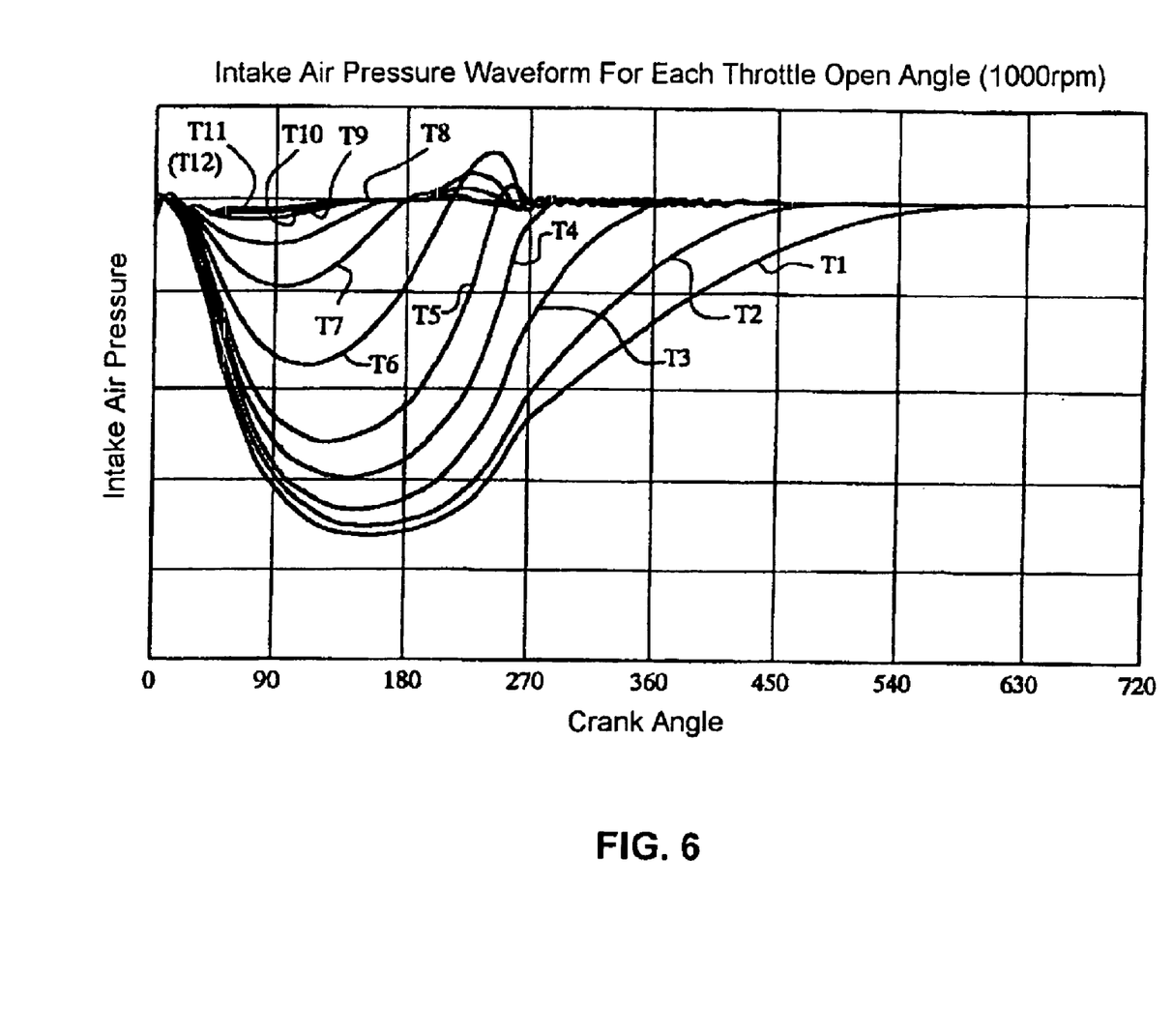
FIG. 6 is a graph showing intake air pressure lines for each load in the internal combustion engine to illustrate the one embodiment of the present invention.
Figure 7:
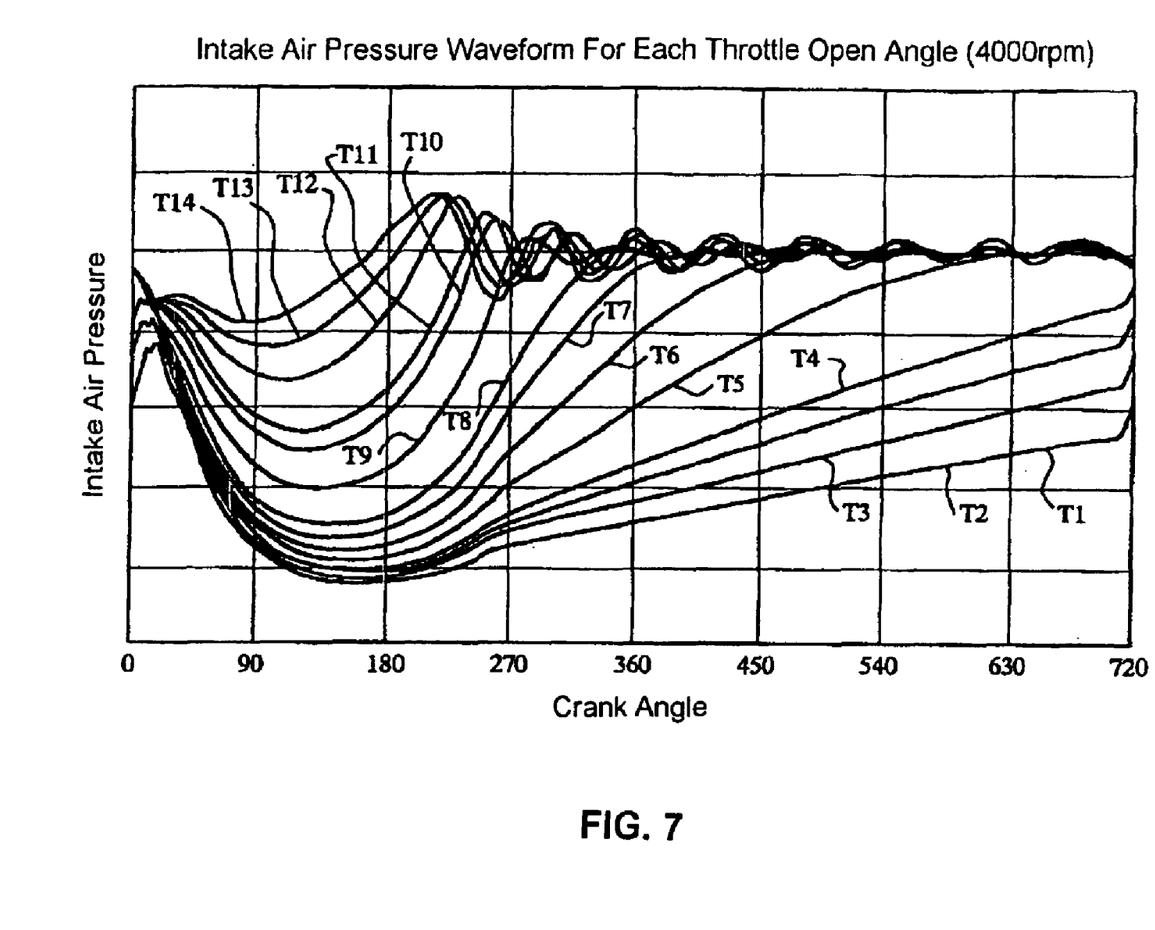
FIG. 7 is another graph showing intake air pressure lines for each load in the internal combustion engine to illustrate the one embodiment of the present invention.
Figure 8:
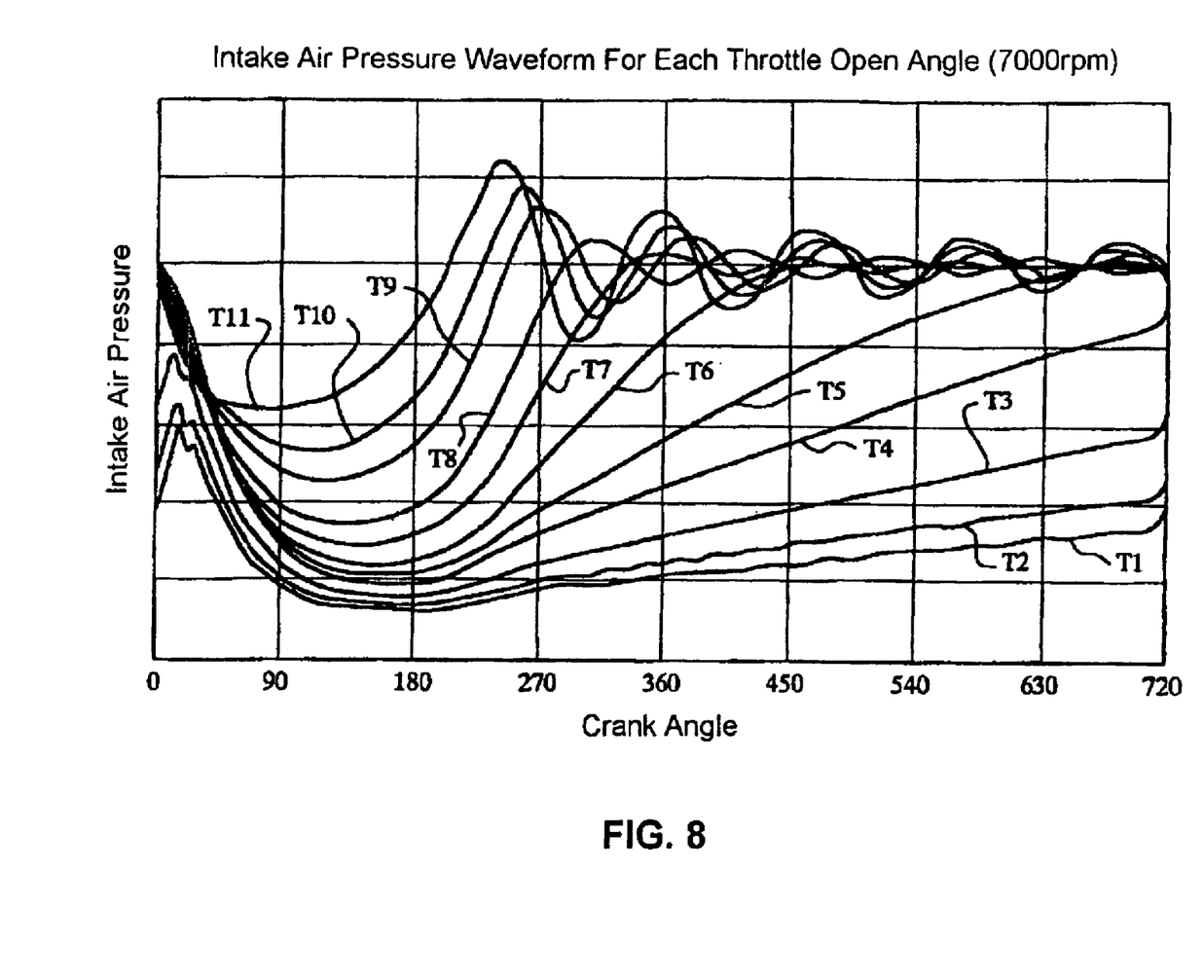
FIG. 8 is still another graph showing intake air pressure lines for each load in the internal combustion engine to illustrate the one embodiment of the present invention.

Meanwhile, as shown in FIGS. 6 to 8, at the time of high load (when the throttle open angle is large), the intake air pressure is affected by inertia of the intake air flowing inside the intake pipe 7, which causes such a phenomenon that the maximum value Vmax of the intake air pressure varies greatly.

In FIGS. 6 to 8, curves T1 to T14 are intake air pressure variation curves corresponding to throttle open angles, and are obtained in increasing the throttle open angle gradually in a range of 0.5 to 90 degrees so that T1<T2<T3 ... <T14.

Thus, when the maximum value Vmax of the intake air pressure V varies, it is presumed that the stable detection cannot be performed due to the relationship between the pressure and detection timing of the pressure.

In order to suppress effects of such a phenomenon, it is effective to set the maximum value Vmax to be the atmospheric pressure.

It is because the maximum pressure available inside the intake pipe 7 is the atmospheric pressure when estimating a static flow of intake air inside the intake pipe 7, and by adopting the atmospheric pressure as the maximum value Vmax, variations are suppressed in the maximum value Vmax that is a threshold value of the intake air volume estimation, thereby enhancing the precision in estimating the intake air volume.

Then, when the maximum value Vmax is thus the atmospheric pressure, the relationship between the average intake air pressure Vave and the intake air volume is obtained in almost the same way as in the case where the maximum value Vmax is a detected value, and a detected value is detected at a position where the detected Vmax is stable as described previously.

Further, in either method for measuring intake air volume as described previously, as shown in FIGS. 3 to 5, such a phenomenon occurs that the relationship between the average intake air pressure Vave and the intake air volume deteriorates at the time of low load.

It is presumed that the phenomenon occurs due to the fact that variations in pressure inside the intake pipe occurring in an exhaust stroke at the time of low load affect the average calculation processing.

Then, in order to improve the relationship between the calculated average intake air pressure Vave and the intake air volume in a low load region, the maximum value Vmax is set at the average value of all the intake air pressures (V1 to V8 in this embodiment) detected in all the strokes of the internal combustion engine 1, and it is thereby possible to resolve the inconvenience at the time of low load as described previously.

Figure 9:
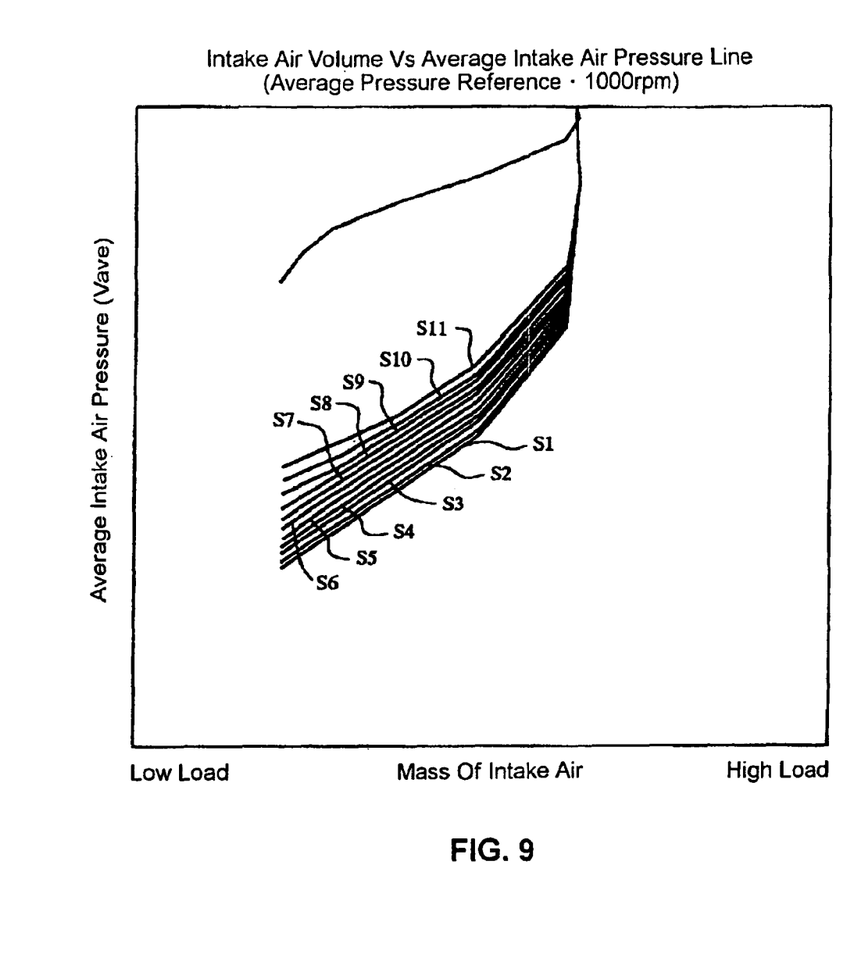
FIG. 9 is a graph showing the relationship between the intake air volume and average intake air pressure in another embodiment of the present invention.
Figure 10:
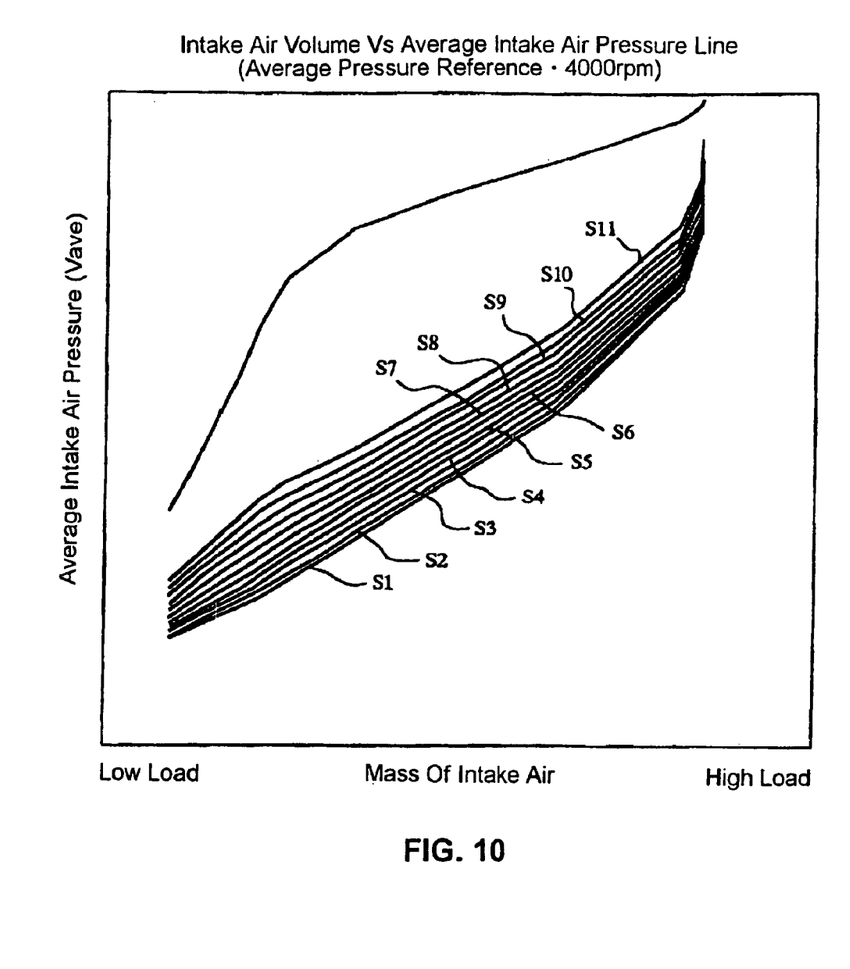
FIG. 10 is another graph showing the relationship between the intake air volume and average intake air pressure in the another embodiment of the present invention.
Figure 11:
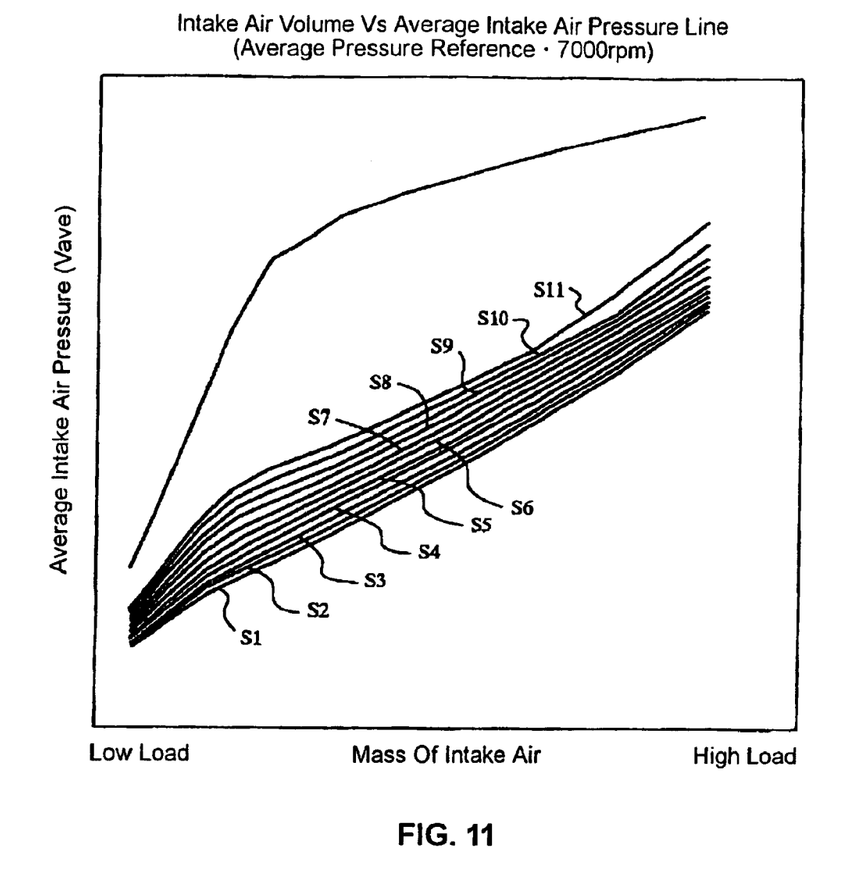
FIG. 11 is still another graph showing the relationship between the intake air volume and average intake air pressure in the another embodiment of the present invention.

FIGS. 9 to 11 each show the relationship between the average intake air pressure Vave and the intake air volume with the average value of all the detected intake air pressures set as the maximum value Vmax in cases where the number of rotations of the internal combustion engine 1 is 1000 (rpm), 4000 (rpm) or 7000 (rpm), respectively.

Herein, curves S1 to S11 were obtained by increasing the constant R gradually so that curve S1<curve S2<...<curve S11.

Thus, by setting the maximum value Vmax at the average value of all the intake pressures (V1 to V8 in this embodiment) detected in all the strokes of the internal combustion engine 1, the relationship between the calculated average intake air pressure Vave and the intake air volume is greatly improved at the time of low load.

Figure 12:
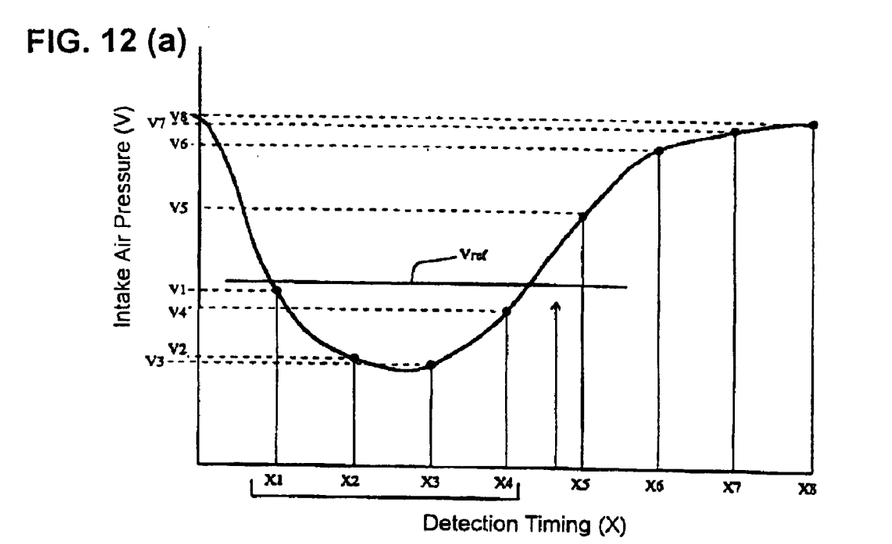
FIG. 12(a) and FIG. 12(b) are graphs illustrating still another embodiment of the present invention, and showing the relationship between a threshold pressure and intake air pressure line.

Further, as shown in FIGS. 12(a) and 12(b), with respect to set two constants Rs, despite of a small difference between threshold pressures Vrefs calculated from the constants Rs respectively, it is presumed that the number of intake pressures Vs added in calculating the average intake air pressure Vave varies, and that the value of calculated average intake air pressure Vave varies greatly.

In the sample shown in the figure, the increased number corresponds to intake air pressure V1, and such a phenomenon tends to occur when detection internals of the intake air pressure V are large and the number of sampling is small.

In order to prevent the average intake air pressure Vave from varying greatly in response to a minute variation in the threshold pressure Vref, following measures are further considered.

Figure 13:
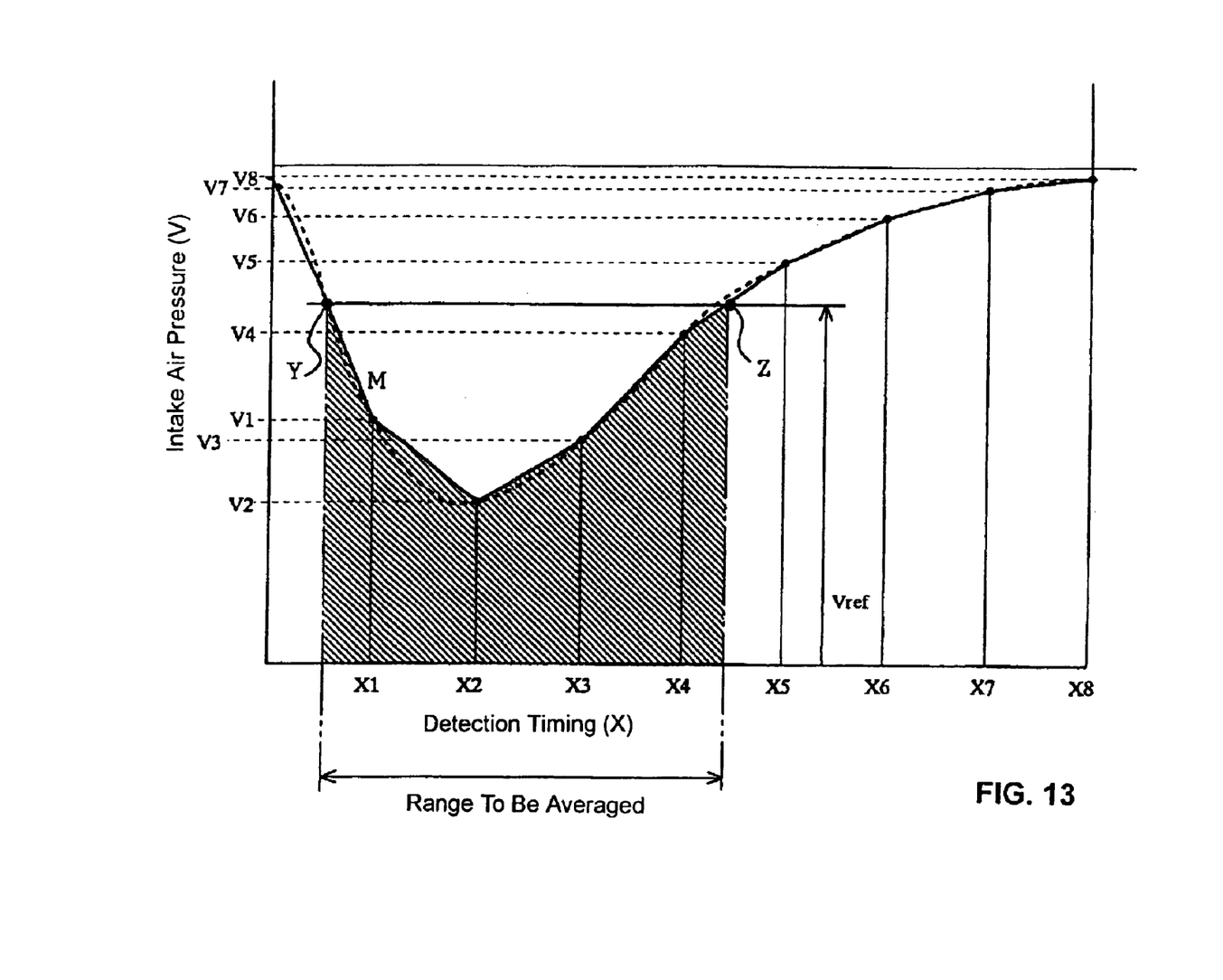
FIG. 13 is a graph illustrating a further embodiment of the present invention, and showing the relationship between the threshold pressure and intake air pressure line.

That is, as shown in FIG. 13, a virtual intake air pressure line M is created by linearly connecting all the intake air pressures (V1 to V8 in this embodiment) detected in all the strokes of the internal combustion engine 1, the intake air pressures (shown by the oblique lines in FIG. 13) indicated by the virtual intake air pressure line M are averaged between two intersection points (points Y and Z in FIG. 13) of the virtual intake air pressure line M and the threshold pressure Vref, and thus the average intake air pressure Vave is calculated.

By using the virtual intake air pressure line M, intervals between adjacent detected intake air pressures in V1 to V8 are made continuous virtually, and thereby, higher and lower intake air pressures Vs near a detected intake air pressure V are selected. Therefore, a variation in the calculated average intake air pressure Vave is suppressed to a small value with respect to a minute variation in the threshold pressure Vref, and the relationship between the average intake air pressure Vave and the intake air volume is made more linear.

In addition, the form, size and others of each structural member illustrated in the above embodiment are samples, and are capable of being modified variously based on design requirements or the like.

For example, it may be possible to use an intake air pressure obtained at a crank angle of near 540 degrees as the maximum value Vmax used in calculating the average intake air pressure Vave.

This is based on the fact that the intake valve 5 is closed at the crank angle and the pressure inside the intake pipe 7 is relatively stable, and such an advantage is obtained that the relationship between the average intake air pressure Vave and the intake air volume can be made more linear at the time of low load.

However, in this case, since it is required to make a judgment on intake or exhaust stroke, the control is made complicated to some extent.

Figure 14:
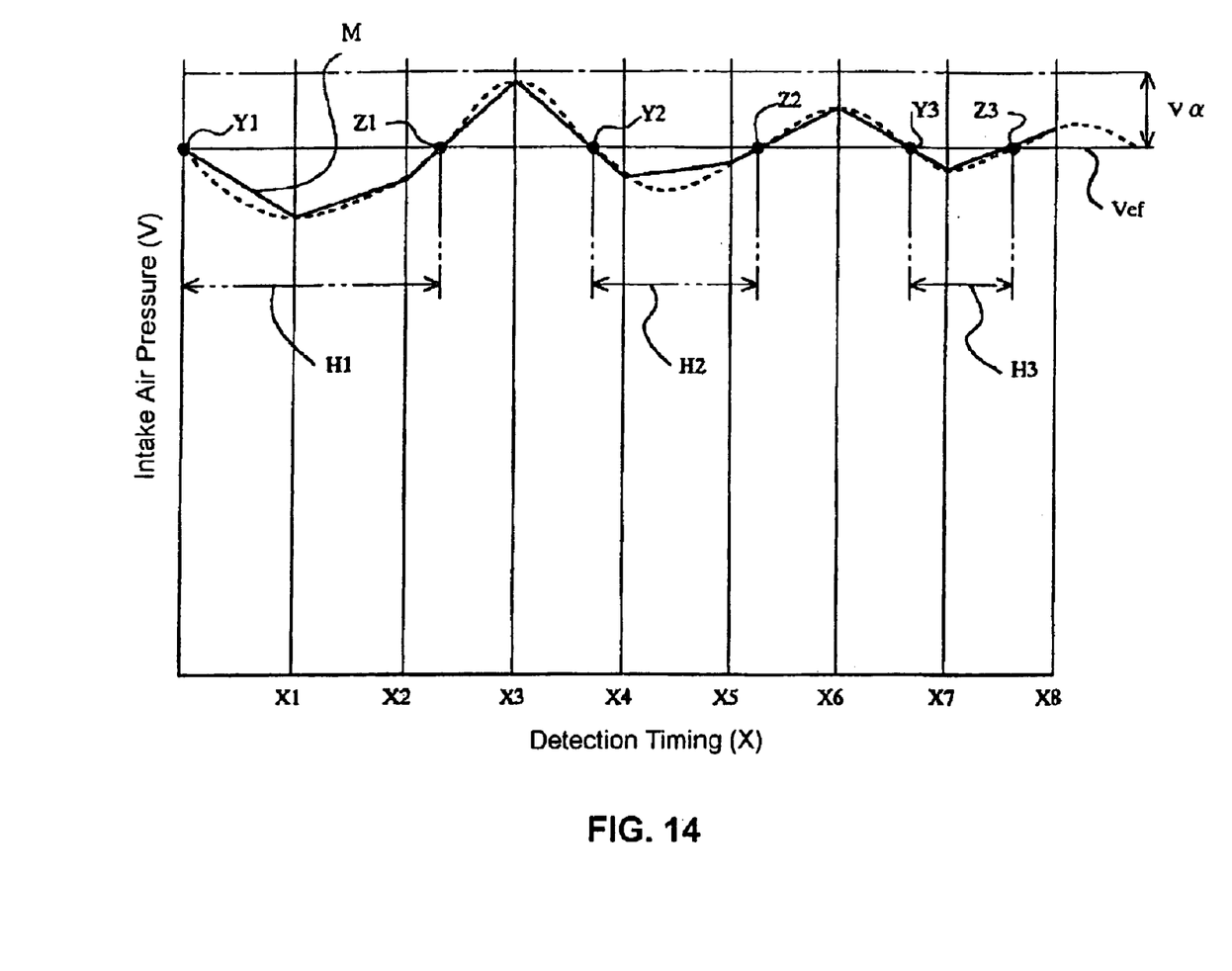
FIG. 14 is a graph illustrating a still further embodiment of the present invention, and showing the relationship between the threshold pressure and intake air pressure line.

Further, at the time of high load, as shown by the oblique lines in FIG. 14, such a phenomenon occurs that the intake air pressure V is pulsated.

When such a pulsation occurs, the number of intersection points of the threshold pressure Vref calculated at the beginning and virtual intake air pressure line M is multiple as shown by Y1 to Y3 and Z1 to Z3 in FIG. 14, a plurality of averaging regions, H1 to H3, is set by these intersection points, and in estimating the intake air volume, a procedure is required that average values of averaging regions H1 to H3 are further averaged to obtain the average intake air pressure Vave. Moreover, since it is required to calculate intersection points Y1 to Y3 and Z1 to Z3, an inconvenience occurs that the control is complicated.

However, at the time of such a high load, since the pressure inside the intake pipe 7 is assumed to be approximately equal to the atmospheric pressure, by adding a correction pressure Vα of a predetermined value to the calculated threshold pressure Vref as shown in FIG. 14, the intake air pressures in all the stokes are averaged, and it is possible to eliminate the effects associated with the pulsation as described previously.

The addition processing of the correction intake air pressure Vα can be performed by switching the control method at the time the load becomes high, while it is possible to perform the addition processing in all load regions.

INDUSTRIAL APPLICABILITY

As described above, according to the method for measuring intake air volume in an internal combustion engine of the present invention, it is possible to estimate the intake air volume with high precision even using an intake air pressure as a parameter for the intake air volume, and as a result, it is possible to control a fuel injection amount properly.

Moreover, intake pressures in all the strokes of the internal combustion engine 1 are detected at a plurality of timings, the average intake air pressure is calculated based on the plurality of detected intake air pressures, and therefore, the average intake air pressure is calculated independently of the crank angle of the internal combustion engine.

Accordingly, even when the intake air pressure sensor is provided at a position some distance apart from the intake pipe using a connecting pipe and delays and rounding occurs in variations in detected intake air pressure with respect to variations in intake air pressure inside the intake pipe, it is possible to suppress effects of the delays and rounding, and to perform the control to estimate the intake air volume with ease and with high precision.

Further, since the effects of delays and rounding caused by using the connecting pipe and others are reduced, it is possible to enhance the versatility of setting position of an intake air pressure sensor, in other words, to enhance the versatility of layout of structural members of the internal combustion engine.

Furthermore, in a conventional method for estimating intake air volume using an intake air pressure as a parameter, since the relationship between the intake air pressure and the intake air volume becomes inaccurate at the time of high load, it is required to switch the control method at the time of high load to a method for estimating intake air volume using the throttle open angle and the number of rotations of the internal combustion engine. However, in the present invention such control switching operation is not required, the control to estimate the intake air volume is made easy also in this respect, and since the throttle open angle signal is not required to estimate the intake air volume, it is possible to simplify the control apparatus.

What is claimed is:

1. A method for measuring intake air volume in an internal combustion engine, comprising:
   detecting intake air pressures in the internal combustion engine at a plurality of timings during all strokes of the internal combustion engine;
   setting a threshold pressure between a maximum value and a minimum value of detected intake air pressures;
   averaging intake air pressures less than or equal to the threshold pressure among the detected intake air pressures to obtain an average intake air pressure; and
   measuring the intake air volume using the average intake air pressure as a parameter.

2. The method for measuring intake air volume in an internal combustion engine according to claim 1, wherein a difference between the maximum value and the minimum value of intake air pressures is obtained, and a predetermined rate of the difference between the maximum value and the minimum value is added to the minimum value to set the threshold pressure.

3. The method for measuring intake air volume in an internal combustion engine according to claim 1, wherein the maximum value is atmospheric pressure.

4. The method for measuring intake air volume in an internal combustion engine according to claim 1, wherein the maximum value is an average value of all the intake air pressures detected in all the strokes of the internal combustion engine.

5. The method for measuring intake air volume in an internal combustion engine according to claim 1, wherein a virtual intake air pressure line is created by connecting linearly all the intake air pressures detected in all the strokes of the internal combustion engine, and based on the virtual intake air pressure line, the average intake air pressure is calculated.

6. The method for measuring intake air volume in an internal combustion engine according to claim 1, wherein the predetermined rate of the difference between the maximum value and the minimum value which is added to the minimum value is varied corresponding to a state of operation of the internal combustion engine.

7. The method for measuring intake air volume in an internal combustion engine according to claim 1, wherein the internal combustion engine is an independent air intake type of internal combustion engine.

8. The method for measuring intake air volume in an internal combustion engine according to claim 2, wherein the maximum value is atmospheric pressure.

9. The method for measuring intake air volume in an internal combustion engine according to claim 2, wherein the maximum value is an average value of all the intake air pressures detected in all the strokes of the internal combustion engine.

10. The method for measuring intake air volume in an internal combustion engine according to claim 2, wherein a virtual intake air pressure line is created by connecting linearly all the intake air pressures detected in all the strokes of the internal combustion engine, and based on the virtual intake air pressure line, the average intake air pressure is calculated.

11. The method for measuring intake air volume in an internal combustion engine according to claim 3, wherein a virtual intake air pressure line is created by connecting linearly all the intake air pressures detected in all the strokes of the internal combustion engine, and based on the virtual intake air pressure line, the average intake air pressure is calculated.

12. The method for measuring intake air volume in an internal combustion engine according to claim 8, wherein a virtual intake air pressure line is created by connecting linearly all the intake air pressures detected in all the strokes of the internal combustion engine, and based on the virtual intake air pressure line, the average intake air pressure is calculated.

13. The method for measuring intake air volume in an internal combustion engine according to claim 4, wherein a virtual intake air pressure line is created by connecting linearly all the intake air pressures detected in all the strokes of the internal combustion engine, and based on the virtual intake air pressure line, the average intake air pressure is calculated.

14. The method for measuring intake air volume in an internal combustion engine according to claim 9, wherein a virtual intake air pressure line is created by connecting linearly all the intake air pressures detected in all the strokes of the internal combustion engine, and based on the virtual intake air pressure line, the average intake air pressure is calculated.

15. The method for measuring intake air volume in an internal combustion engine according to claim 2, wherein the predetermined rate of the difference between the maximum value and the minimum value which is added to the minimum value is varied corresponding to a state of operation of the internal combustion engine.

16. The method for measuring intake air volume in an internal combustion engine according to claim 3, wherein the predetermined rate of the difference between the maximum value and the minimum value which is added to the minimum value is varied corresponding to a state of operation of the internal combustion engine.

17. The method for measuring intake air volume in an internal combustion engine according to claim 8, wherein the predetermined rate of the difference between the maximum value and the minimum value which is added to the minimum value is varied corresponding to a state of operation of the internal combustion engine.

18. The method for measuring intake air volume in an internal combustion engine according to claim 4, wherein the predetermined rate of the difference between the maximum value arid the minimum value which is added to the minimum value is varied corresponding to a state of operation of the internal combustion engine.

19. The method for measuring intake air volume in an internal combustion engine according to claim 9, wherein the predetermined rate of the difference between the maximum value and the minimum value which is added to the minimum value is varied corresponding to a state of operation of the internal combustion engine.

20. The method for measuring intake air volume in an internal combustion engine according to claim 5, wherein the predetermined rate of the difference between the maximum value and the minimum value which is added to the minimum value is varied corresponding to a state of operation of the internal combustion engine.

* * * * *